Dec. 31, 1935.  S. GUARNASCHELLI  2,026,166
FLEXIBLE METALLIC TUBE OR HOSE
Filed Jan. 26, 1934

INVENTOR
Stephen Guarnaschelli
BY
Marshall & Hawley,
ATTORNEYS

Patented Dec. 31, 1935

2,026,166

UNITED STATES PATENT OFFICE 2,026,166

FLEXIBLE METALLIC TUBE OR HOSE

Stephen Guarnaschelli, Brooklyn, N. Y., assignor to Packless Metal Products Corporation, New York, N. Y., a corporation of Delaware Application January 26, 1934, Serial No. 708,339

5 Claims. (Cl. 285—72)

This invention relates to flexible metallic tube or hose and particularly to hose units having flexible metallic sheaths and to coupling means for securing the sheath to the ends of the hose or tube.

More specifically, the invention relates to flexible tubing of the corrugated type. Such tubing when put under pressure tends to elongate or flatten out and this is prevented by the use of a flexible sheath, of metal or other suitable material. It is therefore most essential that the ends of the sheath be securely connected to the ends of the tube.

This invention has for its salient object to provide a flexible hose of the character described with a simple and practical fitting or coupling that can be easily and readily secured thereto.

Another object of the invention is to provide a structure comprising a hose and protective sheath with coupling means securely holding the sheath in position on the hose.

Another object is to provide a leak-proof connection betwen the end of the flexible tubing and the coupling without the use of solder or other packing.

Figure 1:
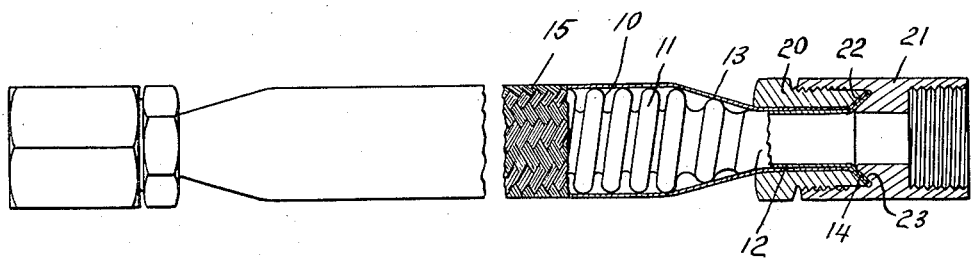
Figure 2:
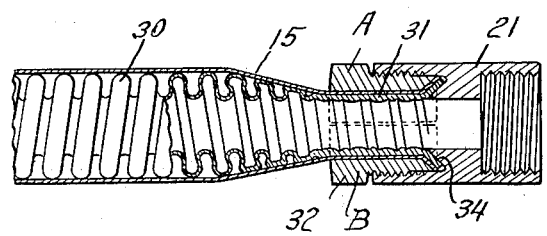

Further objects of the invention will appear from the following specification taken in connection with the drawing which forms a part of this application, and in which Fig. 1 is an elevational view partly in section of a hose or flexible tube unit having a protecting sheath thereon, couplings being mounted on the ends of the tube and securing the sheath in position thereon; and Fig. 2 is a sectional elevation illustrating a slightly modified form of construction.

The invention briefly described consists of a flexible metallic tube having smooth end portions reduced in section, the main portion of the tube being formed with spiral or helical corrugations, and the portions of the corrugated section of the tube adjacent the smooth end portions being tapered. The outer ends of the smooth end portions are flared and a coupling is mounted on each of these portions. A flexible sheath surrounds the tube and extends from end to end thereof, the ends of the sheath being positioned over the flared ends of the hose. The couplings are clamped securely on the ends of the hose and firmly grip the ends of the metallic sheath.

Further details of the invention will appear from the following description.

In the embodiment of the invention illustrated in Fig. 1 there is shown a flexible metallic tube 10 formed with helical corrugations 11 and having smooth end portions 12. The end portions are reduced in section or, in other words, have a smaller outside diameter than the main body portion of the hose. Intermediate the reduced portions or ends 12 and the main body portion of the hose, the hose is tapered as shown at 13. The outer ends of the smooth end portions 12 are flared outwardly, as shown at 14. A flexible sheath 15 surrounds the hose from end to end, the outer ends of the sheath overlying the flared ends 14 of the hose. On each end of the hose unit there is mounted a coupling comprising a pair of threaded members 20 and 21. The member 20 consists of a sleeve having a conical end 22 conforming in shape to the flared end 14 of the hose. The other coupling member 21 has formed therein a conical seat 23 which also conforms in shape to the flared end 14 and forms a metal to metal contact or seat therewith. The coupling member 21 is threaded on the member 20.

The coupling member 20 is passed over the smooth end portion 12 of the hose and also over the surrounding sheath before the end of the hose is flared, as shown at 14. The hose is then flared at the end and the coupling member 21 is threaded on the inner member 20 tightly gripping the end of the hose and the end of the sheath.

It will be evident from the foregoing description that the sheath will be firmly and securely held to the ends of the hose or tube unit and will effectively prevent elongation or stretching of the unit under pressure. The tapered end portions 13 of the unit which are corrugated, by engagement with the sheath, afford effective frictional resistance and aid in preventing any relative movement between the sheath and hose unit.

From the particular construction of the hose unit and especially the tapered end portions 13 thereof it will be evident that a considerable amount of care must be exercised to secure the right length of unit. Fig. 2 illustrates a modified form of construction that is more practical in that the desired lengths may be made up without exercising as great care as that required to make up the length shown in Fig. 1.

The form of hose unit shown in Fig. 2 comprises a main body portion 30 formed with spiral corrugations and a reduced end portion 31 which corresponds to the end portion 12 shown in Fig. 1, but is formed by rolling down or flattening the corrugations on a mandrel to form an outer substantially smooth end portion with a reduced diameter. The unit shown in Fig. 2 has a flexible sheath 15 mounted thereon and extending from end to end thereof.

The coupling shown in Fig. 2 is similar to that shown in Fig. 1 but is different therefrom in that the inner member 32 is sectional or is formed of two half sections A and B. With this form of construction the flared end 34 may be formed before the coupling member 32 is placed thereon and the two half sections A and B can be mounted or placed around the reduced end 31 and sheath 15. This form of construction is simple and practical and can be easily and quickly assembled. It will be understood that both ends of the hose unit shown in Fig. 2 are alike, one end only being illustrated. This form also has the advantage of forming a leak-proof metal to metal seat between the end of the flexible tubing and the coupling member 21.

Although certain specific embodiments of the invention have been particularly shown and described it will be understood that the invention is capable of modification and that changes in the construction and arrangement of the various cooperating parts may be made without departing from the spirit or scope of the invention, as expressed in the following claims.

What I claim is:

1. In combination, a flexible seamless tube having corrugations and having smooth end portions of smaller diameter than the remaining portion thereof, the corrugated portion adjoining the smooth portions being tapered, the free ends of the smooth reduced portions being flared outwardly, a flexible sheath surrounding the tube from end to end thereof, and couplings surrounding the smooth portions and sheath and clamped to the sheath and flared ends of the tube.

2. In combination, a flexible seamless tube having corrugations and having smooth end portions of smaller diameter than the remaining portion thereof, the corrugated portion adjoining the smooth portions being tapered, the free ends of the smooth reduced portions being flared outwardly, a flexible sheath surrounding the tube from end to end thereof, couplings surrounding the smooth portions and sheath and clamped to the sheath and flared ends of the tube, each coupling comprising a member mounted on the reduced portion and having a surface conforming to the flared end and a threaded portion, and another member having a surface seating in the flared end and having a threaded portion engaging the threaded portion of the other coupling member.

3. In combination, a flexible metallic tube having corrugations and having flared end portions, a flexible sheath surrounding the tube from end to end, and a coupling at each end of the tube surrounding and clamping the sheath to the flared end thereof.

4. In combination, a flexible metallic tube having corrugations and having flared end portions, a flexible sheath surrounding the tube from end to end, and a coupling at each end of the tube surrounding and clamping the sheath to the flared end thereof, each coupling comprising a pair of members threaded one on the other and having tapered clamping portions engaging the tapered end of the tube.

5. In combination, a flexible metallic tube having corrugations and having reduced end portions and flared ends, a flexible sheath surrounding the tube from end to end, a coupling at each end of the tube clamping the sheath to the flared end thereof, each coupling comprising a pair of semi-cylindrical externally threaded members over a part of the reduced portion of the tubing, and an internally threaded member screwed onto the semi-cylindrical members and having a conical seat engaging another part of the reduced portion of the tubing.

STEPHEN GUARNASCHELLI.